July 27, 1965 E. L. WEIMER 3,196,574
MAGNETICALLY ACTUATED FISHING PLUG
Filed Nov. 29, 1963
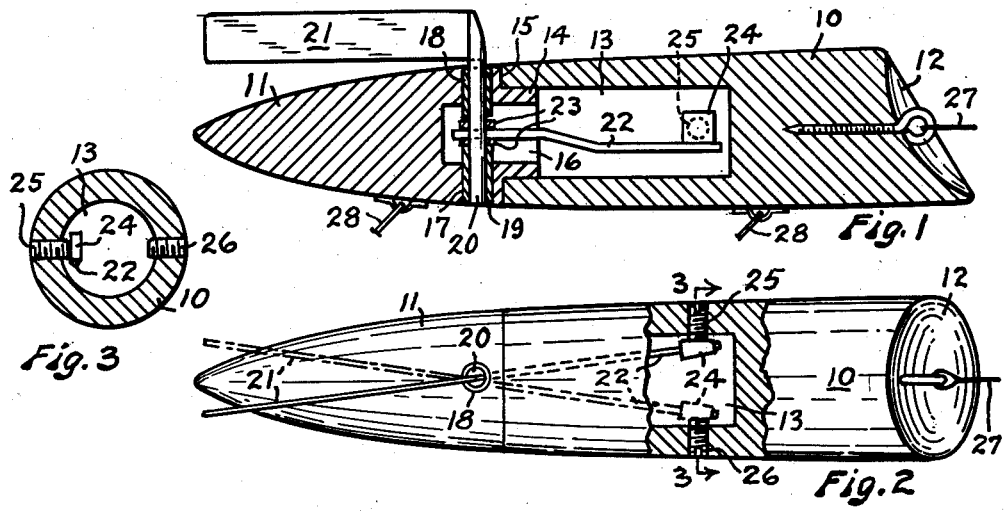
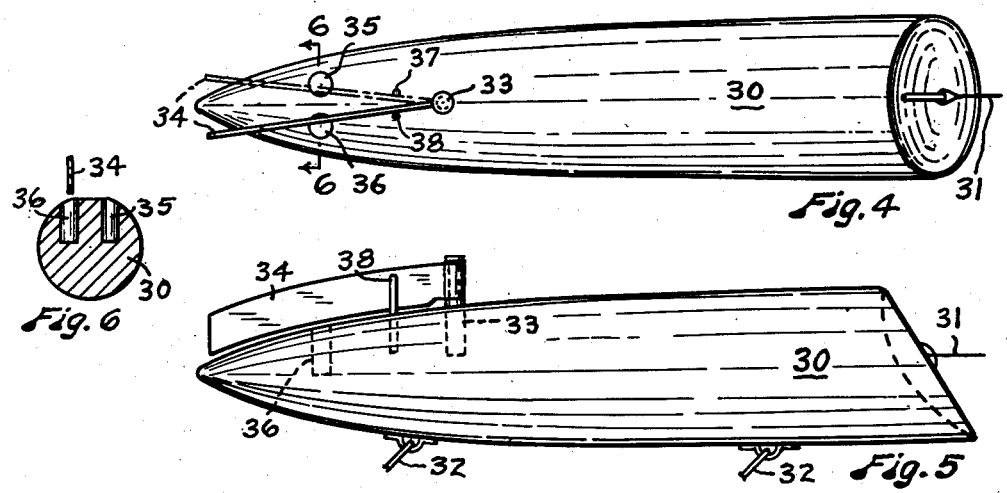
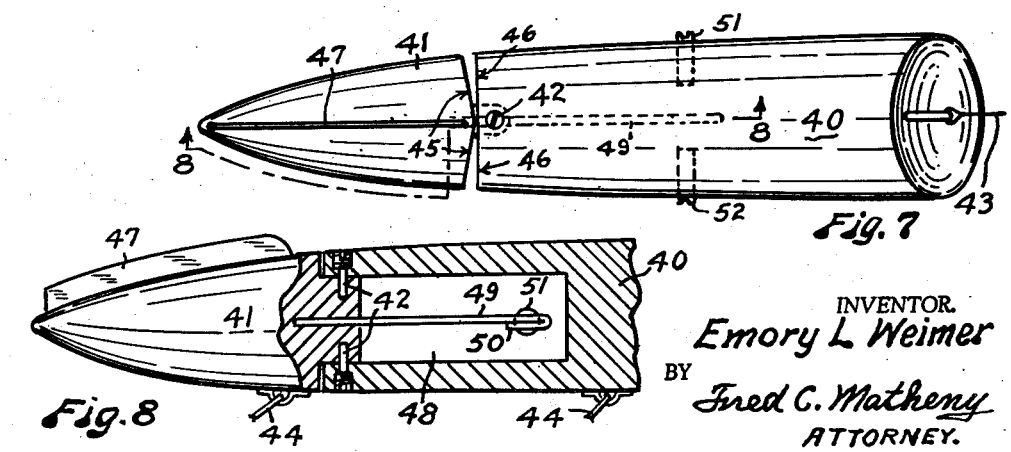
INVENTOR.
Emory L. Weimer
BY Fred C. Matheny
ATTORNEY.

3,196,574
MAGNETICALLY ACTUATED FISHING PLUG
Emory L. Weimer, Orondo, Wash.
Filed Nov. 29, 1963, Ser. No. 326,686
3 Claims. (Cl. 43—42.03)

My invention relates to a magnetically actuated fishing plug and a general object of my invention is to provide a fishing plug having at least one permanent magnet embodied therein and arranged so that it influences or modifies the action or movement of said plug under normal operating conditions in the water.

Another object is to provide a fishing plug having an external fin or vane and having permanent magnet means connected with said fin or vane in such a manner as to cause it to impart movement to the fin or vane to thereby vary the action of the plug in the water and make it more alluring to fish.

Another object is to provide a fishing plug having permanent magnet means connected with it and arranged to modify the action of the plug in the water, said permanent magnet means being adjustable so that the influence it has on the movement or action of the plug in the water can be varied.

Another object is to combine, with a fishing plug which is constructed and shaped so that it has predetermined distinctive movement characteristics under normal conditions of use in the water, magnetically operated means capable of modifying the predetermined movement characteristics of said plug to render it more erratic in its action and more alluring to fish.

Other objects of my invention will be apparent from the following description taken in connection with the accompanying drawings.

In the drawings:

FIGURE 1 is a longitudinal sectional view of a magnetically actuated fishing plug constructed in accordance with my invention, parts being shown in elevation.

FIG. 2 is a top plan view of said plug, with parts broken away and parts shown in section.

FIG. 3 is a view in cross section taken substantially on broken line 3—3 of FIG. 2.

FIG. 4 is a top plan view showing a modified form of magnetically actuated fishing plug embodying my invention.

FIG. 5 is a view in side elevation of the plug shown in FIG. 4.

FIG. 6 is a cross sectional view taken substantially on broken line 6—6 of FIG. 4.

FIG. 7 is a top plan view of another modified form of a magnetically actuated fishing plug embodying my invention.

FIG. 8 is a view partly in side elevation and partly in section taken substantially on broken line 8—8 of FIG. 7.

Like reference numerals refer to like parts throughout the several views.

The fishing plug shown in FIGS. 1, 2 and 3 comprises a plug body of conventional external shape formed of a forward section 10 and a rear section 11. The forward plug section 10 is generally cylindrical in cross section and is provided with a concavely recessed inclined forward end 12 which tends to impart to the plug distinctive movement characteristics in the water. Said forward plug section 10 is further provided with a tubular axial bore or recess 13 extending from its rear end forward therein a substantial distance. The forward end of the rear plug section 11 is provided with a cylindrical axial flange 14 of reduced diameter which fits telescopically and snugly into the rear end portion of the recess 13 in the forward plug section 10. The flange 14 is fixedly secured within the recess 13 by cementing or in any other manner. A shoulder 15 at the rear extremity of the flange 14 fits snugly against the rear end of the forward plug section 10.

An axially disposed tubular bore or recess 16 is provided in the forward end portion of the rear plug section 11. A cross bore 17 extends diametrically across the rear plug section 11 close to but rearwardly of the shoulder 15 and intersects the axial recess 16. Two aligned bearing sleeves 18 and 19 are fixedly supported in the cross bore 17 and have their inner ends spaced apart. A shaft or post 20 is rotatively supported in the sleeves 18 and 19 and has one end portion which extends outwardly and upwardly from the rear plug section 11. A vane or fin 21 of thin material, such as thin flat sheet metal, is secured to the transversely protruding end portion of the shaft 20 and extends rearwardly from said shaft 20 substantially parallel to the axis of the plug and serves as a rudder which is capable of influencing the movement of the plug.

A lever arm 22 is disposed within and extends longitudinally of the recesses 13 and 16 and is secured to the post 20. The lever arm 22 can be a piece of wire and it can be passed through a suitable hole in the post 20 and soldered to said post or it can be secured to said post in other ways. Preferably two thrust washers 23 are provided on the post 20 between the lever arm 22 and the adjacent ends of the respective bearing sleeves 18 and 19 to insure ease of oscillation of the post 20. The forward end of the lever arm 22 has a permanent magnet 24 rigidly secured to it. Two armature members 25 and 26 of magnetic material and which preferably are in the form of screws, are adjustably secured to the forward plug section 10 and positioned on opposite sides of the magnet 24. The bore 13 is large enough in diameter to allow for a substantial amount of sidewise swinging movement of the lever 22.

The forward end of the plug is connected in the usual way with a trolling or fishing line 27 and one or more hooks 28 are connected with the lower circumferential portion of the plug, as fragmentarily shown in FIG. 1. Preferably the hooks 28 are heavy enough or have enough weight connected with them to hold the plug against rotation in the water and with the vane 21 uppermost.

In explaining the operation of the plugs disclosed herein it will be assumed that the plugs are being trolled through water but it will be understood that they will operate similarly if used in flowing water.

When the plug shown in FIGS. 1, 2 and 3 is not in use or is at rest in still water the magnet 24 will be held by magnetic force in engagement with one of the armature members 25 or 26 and the vane 21 will be held either at an incline as indicated by full lines or at an incline as indicated by dotted lines in FIG. 2. When said plug is trolled through the water the vane 21, acting like a rudder, will tend to steer the plug to one side. At the same time the line 27 will tend to pull the plug straight ahead and the water reacting against the plug will, depending on the shape of the plug, tend to impart to it some predetermined characteristic movement, such as an oscillating or darting or wobbling movement. Under these conditions and at certain times in the movement of the plug through the water the water pressure against the vane 21 will become great enough so that it will begin to move the magnet 24 away from the armature member against which it is being held. This movement may be slow at first and the angular movement may cease when the vane and magnet are in a mid position and the magnetic forces are balanced but after the magnet has been moved past a mid position it will usually be snapped into engagement with the other armature member. Thus a snappy movement is imparted to the vane 21 and a corresponding force exerted on the plug each time the magnet shifts from one armature to the other. The force thus applied to the plug modifies the normal operation of the plug and causes it to have an erratic movement each time the magnet 24 changes from one pole to the other and this movement has been found to be highly alluring to fish. This movement can be varied by adjusting either one or both of the armatures 25 or 26 toward or away from the magnet 24. If the armatures are set sufficiently close together the magnet 24 will move back and forth between them at a rapid rate and a movement in the nature of a vibration or fluttering will be imparted to the plug.

Although the member 24 is herein described as being a permanent magnet and the adjustable members 25 and 26 as being armatures of magnetic material it will be understood that this fishing plug will operate in the same manner if this condition is reversed by making the member 24 an armature of magnetic material and the members 25 and 26 permanent magnets.

FIGS. 4, 5 and 6 disclose an embodiment of my invention comprising a fishing plug 30 which may be of conventional one piece construction and which has a line 31 and hooks 32 connected therewith. A post 33 is rigid with the plug 30 and extends upwardly therefrom. A flat vane 34 of magnetic material is pivotally supported by the post 33 and extends rearwardly therefrom along the plug 30 toward the rear end of said plug. Two spaced apart permanent magnets 35 and 36 are embedded in the plug 30 at opposite sides of a longitudinal vertical plane which bisects the plug and passes through the axis of the post 33. The upper ends of the magnets 35 and 36 are herein illustrated as being flush with the plug 30 but they can project from said plug 30. Two spaced apart stop pins 37 and 38 are rigid with the plug 30 and protrude upwardly therefrom at opposite sides of the vane 34 and limit sidewise swinging movement of said vane 34. Obviously the magnets 35 and 36 can protrude from the plug far enough to serve as stop means at the sides of the vane 34, in which instance the stop pins 37 and 38 can be dispensed with.

The operation of the fishing plug shown in FIGS. 4, 5 and 6 is substantially the same as the previously described operation of the plug shown in FIGS. 1, 2 and 3.

FIGS. 7 and 8 disclose an embodiment of my invention comprising a jointed plug formed of a forward section 40 and a rear section 41 connected together for limited swinging movement relative to each other by screw type pivot pins 42. A line 43 is connected with the leading end of the forward plug section 40 and preferably at least one hook 44 is connected with the lower side of each of the plug sections 40 and 41. Inclined end surfaces 45 on the forward end of the rear plug section 41 are positioned and arranged so that they will engage with opposed surfaces 46 on the rear end of the forward plug section 40 and limit relative angular movement of said two plug sections. A thin flat vane 47 is rigid with and extends longitudinally of and upwardly from the top side of the rear plug section 41.

The forward plug section 40 has a cylindrical bore 48 extending from its rear end forwardly therein. A lever arm 49, which may be a piece of wire, is longitudinally disposed within the recess 48 and has its rear end portion rigidly connected with the rear vane section 4. Preferably the lever arm 49 is of magnetic material and has its forward end 50 positioned between two spaced apart permanent magnets 51 and 52 which are carried by the forward plug section 50 and can be adjustable like the armature members 25 and 26 of FIGS. 1, 2 and 3.

The fishing plug shown in FIGS. 7 and 8 operates in a similar manner to the plug shown in FIGS. 1, 2 and 3 except that the magnet means instead of swingingly moving a vane only will swingingly move the rear plug section 41 and the vane 47 carried thereby.

The foregoing description and accompanying drawings clearly disclose preferred embodiments of my invention but it will be understood that these disclosures are merely illustrative and that changes may be made within the scope of the following claims.

I claim:

1. A magnetically actuated fishing plug comprising a plug body; a thin flat longitudinally extending water reactance vane of magnetic material positioned adjacent the rear end of said plug body and externally thereof; pivot means connecting the forward end portion of said vane with said plug body providing swinging movement of said vane relative to said plug body about an axis which coincides with the plane of the vane and is perpendicular to and intersects the longitudinal axis of the plug body; and two spaced apart permanent magnets carried by the plug body and positioned at opposite sides of a plane which is common to the longitudinal axes of said pivot means and said plug body, said magnets being capable of magnetically attracting and yieldingly holding said vane.

2. The apparatus as claimed in claim 1 in which stop means is provided limiting the amount of swinging movement of said vane.

3. In a magnetically actuated fishing plug, a plug body; a thin flat vane external to and mounted on the rear end portion of the plug body; pivotal mounting means connecting the forward end portion of said vane with said plug body providing swinging movement of the vane about an axis which intersects and is perpendicular to the longitudinal axis of the plug body and is coincident with the plane of said vane, said vane being movable from one side to the other of a medial position in which the plane of said vane is coincident with the axis of the plug body; and permanent magnet means operatively connected between the plug body and the vane providing a magnetic connection between said plug body and said vane capable of imparting quick pivotal movement to said vane and adapted to yieldingly hold said vane in two different positions at the respective sides of its said medial position.

References Cited by the Examiner

UNITED STATES PATENTS

| | | | |
|---|---|---|---|
| 2,600,437 | 6/52 | Siepe | 43—42.03 |
| 2,741,056 | 4/56 | Sullivan et al. | 43—42.03 |
| 2,871,608 | 2/59 | Fisher | 43—35 |
| 2,883,787 | 4/59 | Dahl | 43—42.22 X |

SAMUEL KOREN, Primary Examiner.

ABRAHAM G. STONE, Examiner.